United States Patent
Suganuma et al.

(10) Patent No.: US 6,428,924 B1
(45) Date of Patent: Aug. 6, 2002

(54) BATTERY STORAGE STRUCTURE FOR PORTABLE ELECTRONIC DEVICE

(75) Inventors: Yuichiro Suganuma, Yokosuka; Haruo Hayakawa, Yokohama, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/076,869

(22) Filed: May 13, 1998

(30) Foreign Application Priority Data

May 29, 1997 (JP) .............................. 9-140509

(51) Int. Cl.[7] .............................................. H01M 2/00
(52) U.S. Cl. ........................ 429/163; 429/175; 429/177; 429/100
(58) Field of Search ................. 429/97, 99, 100, 429/163, 175, 177, 96, 176

(56) References Cited

U.S. PATENT DOCUMENTS 5,242,767 A * 9/1993 Roback et al. ................. 429/97
5,471,667 A * 11/1995 Yamada ........................ 455/351
5,639,570 A * 6/1997 Tamaru ........................ 429/97
5,704,803 A * 1/1998 Oshima et al. ............. 439/500
5,851,692 A * 12/1998 Potts ........................... 429/100

FOREIGN PATENT DOCUMENTS

JP          4-102560         9/1992

* cited by examiner

Primary Examiner—Maria Nuzzolillo
Assistant Examiner—R Alejandro
(74) Attorney, Agent, or Firm—Connolly Bove Lodge & Hutz LLP

(57) ABSTRACT

A battery storage apparatus for a portable electronic device is provided which includes a battery storage chamber formed in a casing of the portable electronic device and a storage chamber cover. A guide rail is formed on the casing. A guide groove is formed in the storage chamber cover and engages the guide rail to allow the storage chamber cover to slide on the guide rail when the storage chamber cover is installed on or removed from the casing. A recess is formed in the guide groove. A protrusion is formed on the guide rail and fitted into the recess to hold the storage chamber cover from moving along the guide rail when the storage chamber cover is installed on the casing completely, thereby avoiding dislodgment of the storage chamber cover from the casing even if the portable electronic device undergoes undesirable physical impact.

2 Claims, 2 Drawing Sheets

BATTERY STORAGE STRUCTURE FOR PORTABLE ELECTRONIC DEVICE

BACKGROUND OF THE INVENTION

1. Technical Field of the Invention

The present invention relates generally to a battery storage structure for a portable electronic device which is capable of holding a battery within a storage chamber securely even if the portable electronic device undergoes undesirable physical impact.

2. Background of Related Art

Japanese Utility Model First Publication No. 4-102560 teaches a battery storage structure of a portable electronic device. The battery storage structure consists of a storage chamber formed in a casing of the portable electronic device and a storage chamber cover. The storage chamber cover is designed to be slidably removable from the casing and held by a locking member. The locking member consists of an elastic claw which is installed in an outer peripheral portion of the storage chamber and which engages a recess formed in an edge of the storage chamber cover.

The above battery storage structure, however, encounters the drawback that the locking member is made of a small resinous mold and may be dislodged from the casing or broken when the electronic device is dropped to the ground.

SUMMARY OF THE INVENTION

It is therefore a principal object of the present invention to avoid the disadvantages of the prior art.

It is another object of the present invention to provide an improved battery storage apparatus capable of holding a battery within a storage chamber formed in a casing of, for example, a portable electronic device even if the portable electronic device undergoes strong physical impact.

According to one aspect of the present invention, there is provided a battery storage apparatus for an electronic device which comprises: (a) a battery storage chamber formed in a casing of the electronic device, the battery storage chamber having an opening for loading and unloading a battery; (b) a storage chamber cover for covering the opening of the battery storage chamber; (c) a guide groove formed in one of the casing of the electronic device and the storage chamber cover; (d) a guide rail formed on the other of the casing of the electronic device and the storage chamber cover, the guide rail engaging the guide groove to define a travel path on which the storage chamber cover slides when the storage chamber cover is installed or removed on and from the casing of the electronic device; and (e) an engagement holding means for holding engagement of the guide rail with the guide groove when the storage chamber cover slides on the travel path and is installed on the casing of the electronic device, the engagement holding means being provided on the travel path of the storage chamber cover.

In the preferred mode of the invention, the engagement holding means includes a recess and a protrusion fitted into the recess to restrict movement of the storage chamber cover on the guide rail when the storage chamber cover is installed on the casing the electronic device completely. The recess is formed on one of the guide groove and the guide rail. The protrusion is formed in the other of the guide groove and the guide rail.

A first and a second protrusion are further provided. The first protrusion is formed on the guide rail. The second protrusion is formed on the guide groove so that the second protrusion is moved over the first protrusion during sliding of the storage chamber cover on the travel path and located at a given interval away from the first protrusion when the storage chamber cover is installed on the casing of the electronic device completely.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
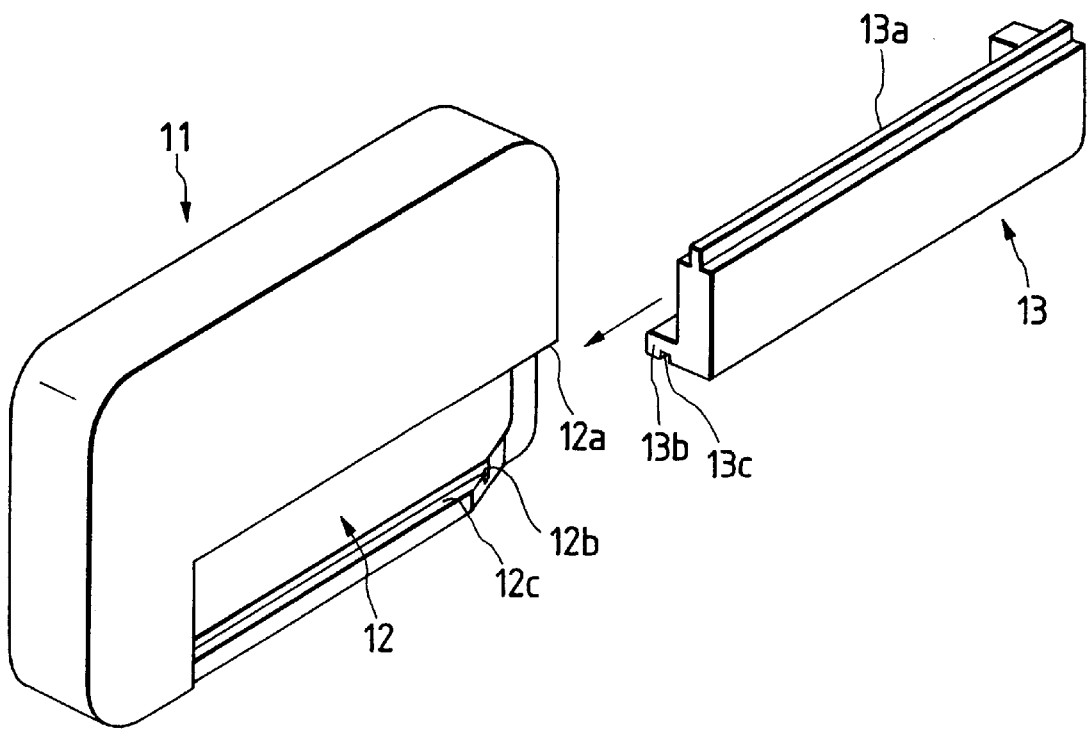
FIG. 1 is a perspective view which shows a battery storage structure for a portable electronic device according to the present invention.

Referring now to the drawings, particularly to FIG. 1, there is shown a battery storage apparatus provided in a portable electronic device according to the present invention.

Figure 2:
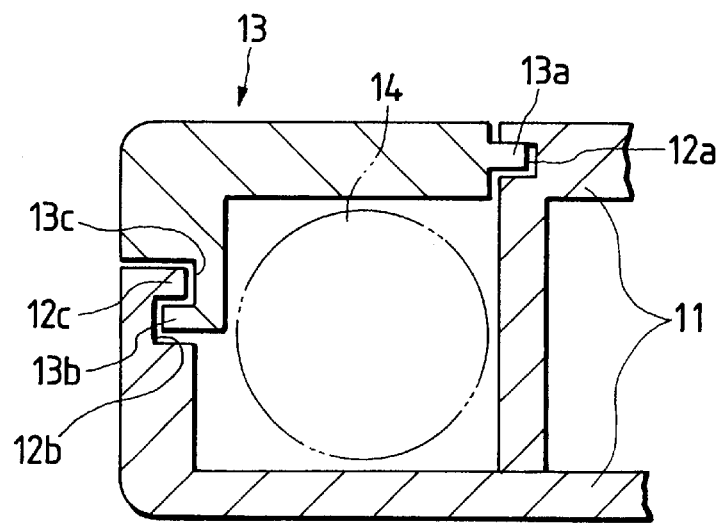
FIG. 2 is a traverse sectional view of FIG. 1.

The battery storage apparatus includes a rectangular storage chamber 12 and a storage chamber cover 13. The storage chamber 12 is formed in a side portion of a casing 11 of the portable electronic device for storage of an AA battery 14 as shown in FIG. 2. The storage chamber cover 13 is designed to be slidable in the lengthwise direction of the casing 11 to open and close the storage chamber 12.

The casing 11 has formed in side edges thereof defining an opening of the storage chamber 12 guide grooves 12a and 12b which engage guide rails 13a and 13b formed on side edges of the storage chamber cover 13 to guide the storage chamber cover 13 in its lengthwise motion. The casing 11 has also formed on the side edge thereof a guide rail 12c extending parallel to the guide groove 12b. The guide rail 12c engages a guide groove 13c formed in the storage chamber cover 13, extending in parallel to the guide rail 13b.

Figure 3:
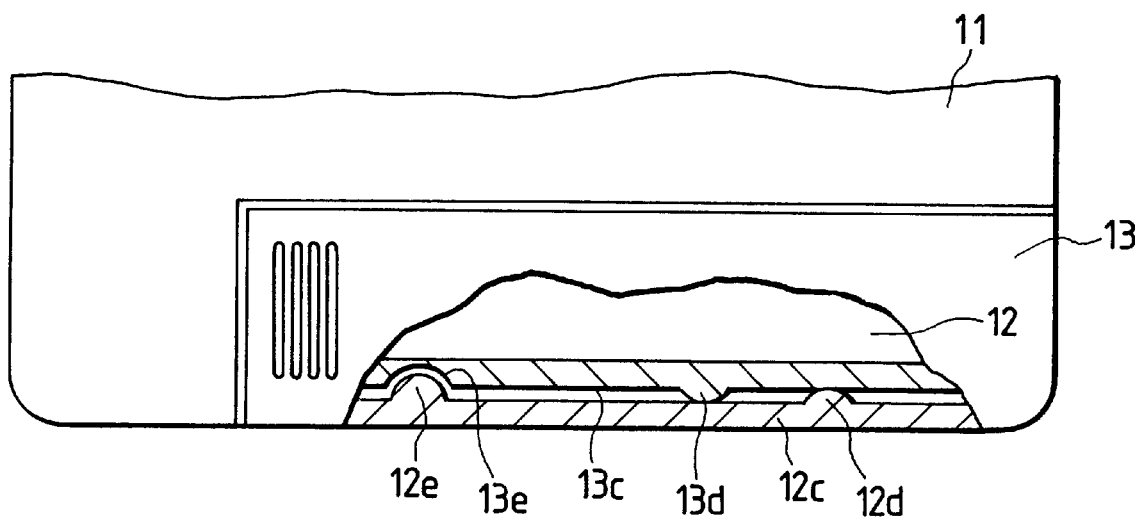
FIG. 3 is a partial sectional view showing engagement of a storage chamber cover and a cover of a portable electronic device.
Figure 4:
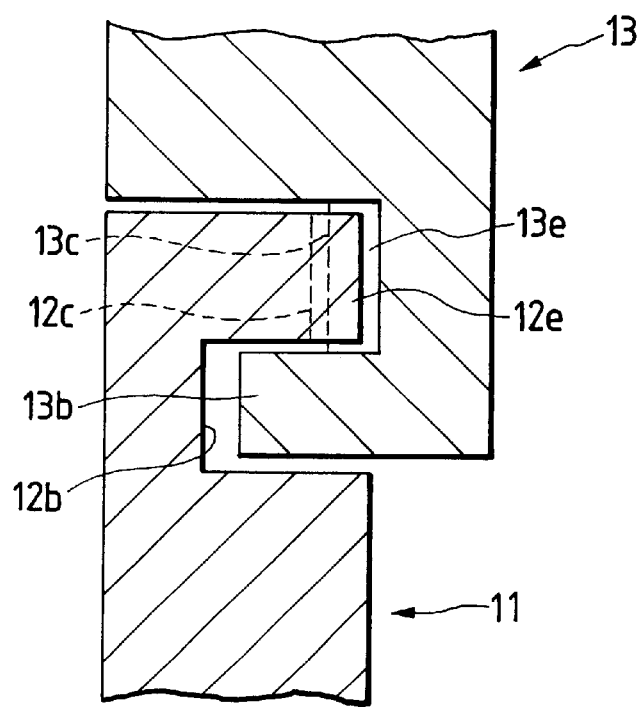
FIG. 4 is an enlarged traverse sectional view of FIG. 3.

The guide rail 12c of the casing 11, as shown in FIGS. 3 and 4, has a small half-moon protrusion 12d and a large half-moon protrusion 12e formed on an inner wall thereof at a given interval away from each other. The guide groove 13c of the storage chamber cover 13 has formed on and in the bottom thereof a half-moon protrusion 13d and a half-moon recess 13e. The protrusion 13d lies between the protrusions 12d and 12e of the guide rail 12c, and the recess 13e receives therein the protrusion 12e of the casing 11 when the storage chamber cover 13 is installed on the casing 11 completely.

In operation, installation of the storage chamber cover 13 on the casing 11 is, as shown in FIG. 1, achieved by inserting the guide rails 13a and 13b into the guide grooves 12a and 12b of the storage chamber cover 13 at the right side of the storage chamber 12, as viewed in the drawing, and sliding the cover 13 horizontally. Upon insertion of the guide rails 13a and 13b into the guide grooves 12a and 12b, the guide rail 12c of the casing 11 engages the guide groove 13c of the storage chamber cover 13.

During the sliding of the storage chamber cover 13, the half-moon protrusion 13d of the storage chamber cover 13 moves over the small half-moon protrusion 12d on the guide rail 12c of the casing 11, and then the recess 13e of the storage chamber cover 13 engages the protrusion 12e on the guide rail 12c, thereby holding the storage chamber cover 13 securely.

If the operator drops the portable electronic device so that the recess 13e of the storage chamber cover 13 disengages from the protrusion 12e on the guide rail 12c, the half-moon protrusion 13d of the storage chamber cover 13 collides with the small half-moon protrusion 12d on the guide rail 12c, thereby arresting further outward sliding of the storage chamber cover 13. If the impact acting on the portable electronic device upon the dropping thereof is great so that the protrusion 13d is moved over the protrusion 12d, the recess 13e engages the protrusion 12d, thereby avoiding the dislodgment of the storage chamber cover 13.

While the present invention has been disclosed in terms of preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

For example, the large and small half-moon protrusions 12e and 12d may alternatively be formed on the guide groove 13c of the storage chamber cover 13, while the half-moon protrusion 13d and the recess 13e may alternatively be formed on and in the guide rail 12c of the casing 11. More than one pair of a protrusion and a recess like the protrusion 12e and the recess 13e and/or more than one pair of protrusions like the protrusions 12d and 13d may also be provided for further ensuring the engagement of the storage chamber cover 13 with the casing 11.

Instead of the recess 13e, a protrusion may be formed on the guide groove 13c so that it moves over and engages the protrusion 12e on the guide rail 12c of the casing 11 when the storage chamber cover 13 is inserted into the casing 11 completely.

Further, the protrusions 12d, 12e, and 13d and the recess 13e may alternatively be provided on and in the guide rail 13a and the guide groove 12a or the guide rail 13b and the guide groove 12b.

What is claimed is:

1. A battery storage apparatus for an electronic device comprising:

a battery storage chamber formed in a casing of the electronic device, said battery storage chamber having an opening for loading and unloading a battery;

a storage chamber cover for covering the opening of said battery storage chamber;

a guide groove formed in one of the casing of the electronic device and said storage chamber cover;

a guide rail formed on the other of the casing of the electronic device and said storage chamber cover, said guide rail engaging said guide groove to define a travel path on which said storage chamber cover slides when said storage chamber cover is installed or removed on and from the casing of the electronic device; and engagement holding means for holding engagement of said guide rail with said guide groove when said storage chamber cover slides on the travel path and is installed on the casing of the electronic device, said engagement holding means being provided on the travel path of said storage chamber cover, said engagement holding means including a recess and a protrusion removably fitted into the recess to restrict movement of said storage chamber cover on said guide rail when said storage chamber cover is completely installed on the casing of the electronic device, the recess being formed on one of said guide groove and said guide rail, the protrusion being formed in the other of said guide groove and said guide rail.

2. A battery storage apparatus for an electronic device comprising:

a battery storage chamber formed in a casing of the electronic device, said battery storage chamber having an opening for loading and unloading a battery;

a storage chamber cover for covering the opening of said battery storage chamber;

a guide groove formed in one of the casing of the electronic device and said storage chamber cover;

a guide rail formed on the other of the casing of the electronic device and said storage chamber cover, said guide rail engaging said guide groove to define a travel path on which said storage chamber cover slides when said storage chamber cover is installed or removed on and from the casing of the electronic device;

engagement holding means for holding engagement of said guide rail with said guide groove when said storage chamber cover slides on the travel path and is installed on the casing of the electronic device, said engagement holding means being provided on the travel path of said storage chamber cover;

a first protrusion, the first protrusion being formed on said guide rail; and a second protrusion being formed on said guide groove so that the second protrusion is moved over the first protrusion during sliding of said storage chamber cover on the travel path and located at a given interval away from the first protrusion when said storage chamber cover is installed on the casing of the electronic device completely.

* * * * *